Patented Sept. 20, 1938

2,130,805

UNITED STATES PATENT OFFICE 2,130,805

STERILIZING AGENT

Arthur A. Levine, Niagara Falls, N. Y., assignor to E. I. du Pont de Nemours & Company, Wilmington, Del., a corporation of Delaware No Drawing. Application February 26, 1936, Serial No. 65,919

2 Claims. (Cl. 210—28)

This invention relates to a process of sterilizing. More particularly it relates to a process of sterilizing or disinfecting any liquid or mixture containing bacteria. It is especially useful in the treatment of water in order to render potable an impure water of high bacterial content.

This invention is concerned with the use, in sterilizing, of the compound 1,3-dichlor 5,5-dimethylhydantoin. This compound is a white, crystalline powder which has a strong odor of hypochlorous acid. Its melting point is approximately 117° C. It is relatively soluble in water and other liquids. Structurally, it may be represented by the following formula:

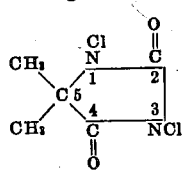

When using 1,3-dichlor 5,5-dimethylhydantoin as a sterilizing agent, this compound is added to the liquid to be sterilized in sufficient amount to provide any desired active chlorine concentration. As will be apparent from the chemical structure of the compound, the chlorine atoms attached to the nitrogen atoms in the ring are readily removed. The compound is therefore a source of active chlorine and will give up substantially all of its chlorine content. As is apparent from the formula, the chlorine content is approximately 36.5%.

As illustrative of the effect of 1,3-dichlor 5,5-dimethylhydantoin in sterilizing river water containing large amounts of bacteria, the following tabular summaries may be given. In each case two samples of river water were treated, one sample being unfiltered and the other filtered through an ordinary sand filter. In the results summarized in Table I sufficient dichlordimethylhydantoin was added to give various chlorine concentrations ranging from 5 to 30 parts per million, one sample of each kind of water, filtered and unfiltered, being kept untreated as a control. Two samples of each chlorine content were prepared, one being examined for bacterial content at the end of six hours and the other at the end of twenty-four hours. As will be apparent from the following table 1,3-dichlor-5,5-dimethylhydantoin acts as an effective sterilizing and disinfecting agent.

TABLE I

Bactericidal tests with dichlordimethylhydantoin for sterilizing unfiltered and screen filtered river water

| Water sample treated | Parts per million chlorine added | Chlorine content after 6 hrs., parts per million | Bacterial content per c. c. after 6 hrs. | Chlorine content after 24 hrs., per million | Bacterial content per c. c., after 24 hrs. |
|---|---|---|---|---|---|
| Unfiltered: | | | | | |
| 1 | 0.0 | 0.0 | 36,500 | | |
| 1A | 0.0 | | | 0.0 | 34,800 |
| 2 | 5 | 3–4 | 50 | | |
| 2A | 5 | | | 3–4 | 50 |
| 3 | 10 | 7–9 | 15 | | |
| 3A | 10 | | | 5–7 | 10 |
| 4 | 20 | 15–17 | 82 | | |
| 4A | 20 | | | 14–16 | 70 |
| 5 | 30 | 25–30 | 89 | | |
| 5A | 30 | | | 20–25 | 83 |
| Filtered: | | | | | |
| 1 | 0.0 | 0.0 | 41,000 | | |
| 1A | 0.0 | | | 0.0 | 39,250 |
| 2 | 5 | 5 | 85 | | |
| 2A | 5 | | | 3–4 | 65 |
| 3 | 10 | 8–10 | 50 | | |
| 3A | 10 | | | 6–8 | 44 |
| 4 | 20 | 18–20 | 65 | | |
| 4A | 20 | | | 18–20 | 50 |
| 5 | 30 | 20–25 | 74 | | |
| 5A | 30 | | | 18–20 | 60 |

For the purpose of investigating the effects of greater chlorine content a second series of samples were tested, the procedure being exactly the same as in the experiments summarized in the foregoing table. In this case, however, somewhat larger amounts of dichlordimethylhydantoin were added, the amount being sufficient to give chlorine contents ranging from 0 to 500 parts per million. These results are summarized in the following table:

TABLE II

| Water sample treated | Parts per million chlorine added | Chlorine content after 24 hrs., parts per million | Bacterial content per c. c. after 24 hrs. | Chlorine content after 48 hrs., per million | Bacterial content per c. c., after 48 hrs. |
|---|---|---|---|---|---|
| Unfiltered: | | | | | |
| 1 | 0.0 | 0.0 | 60,600 | | |
| 1A | 0.0 | | | 0.0 | 50,125 |
| 2 | 50 | 40–45 | 10 | | |
| 2A | 50 | | | 38–40 | 5 |
| 3 | 100 | 80–90 | 85 | | |
| 3A | 100 | | | 75–80 | 25 |
| 4 | 200 | 150–155 | 65 | | |
| 4A | 200 | | | 100–125 | 5 |
| 5 | 500 | 400–450 | 15 | | |
| 5A | 500 | | | 350–400 | 0 |
| Filtered: | | | | | |
| 1 | 0.0 | 0.0 | 51,200 | | |
| 1A | 0.0 | | | 0.0 | Uncountable. |
| 2 | 50 | 45–50 | 70 | | |
| 2A | 50 | | | 40–45 | 20 |
| 3 | 100 | 85–90 | 20 | | |
| 3A | 100 | | | 80–85 | 0 |
| 4 | 200 | 150–175 | 30 | | |
| 4A | 200 | | | 100–150 | 45 |
| 5 | 500 | 450–460 | 5 | | |
| 5A | 500 | | | 375–400 | 75 |

In determining bacterial content per c. c. in the experiments incorporated in the foregoing tables the standard bacteriological procedure was used. Samples of the treated and untreated water were plated, using a nutrient agar-agar plate, and the bacteria were allowed to develop for 48 hours. At the end of that time the bacterial colonies were counted under a low-power microscope and the number of colonies was assumed to represent the number of bacteria present at the time of plating. This is in accordance with the standard bacteriological method for determining bacterial content and, as usual with those methods, gave results which were somewhat variable. However, from the foregoing tables the sterilizing effect of 1,3-dichlor 5,5-dimethylhydantoin is plainly apparent.

My invention is to be understood as applicable wherever any liquid or in fact any other material is to be sterilized. Thus, it is equally useful in the sterilizing of liquids such as milk, cream and in the sterilizing of solids such as butter or ice cream.

My sterilizing compound 1,3-dichlor- 5,5-dimethylhydantoin is a relatively stable solid material which readily yields up all of its chlorine content when applied to a material capable of taking up that chlorine.

This invention is not to be regarded as restricted to any specific sterilizing use nor is it to be regarded as limited except as necessitated by the appended claims.

I claim:

1. A process of sterilizing water which comprises treating said water at substantially room temperature with 1,3-dichlor 5,5-dimethylhydantoin.

2. A process of sterilizing water which comprises treating said water at substantially room temperature with dichlor dimethyl hydantoin.

ARTHUR A. LEVINE.